United States Patent
Ling

(10) Patent No.: US 9,461,742 B2
(45) Date of Patent: Oct. 4, 2016

(54) FEEDBACK-BASED CONFIGURATION OF A HYBRID FIBER-COAXIAL NETWORK

(71) Applicant: MaxLinear, Inc., Carlsbad, CA (US)

(72) Inventor: Curtis Ling, Carlsbad, CA (US)

(73) Assignee: Maxlinear, Inc., Carlsbad, CA (US)

(*) Notice: Subject to any disclaimer, the term of this patent is extended or adjusted under 35 U.S.C. 154(b) by 261 days.

(21) Appl. No.: 14/157,146

(22) Filed: Jan. 16, 2014

(65) Prior Publication Data

US 2014/0199081 A1 Jul. 17, 2014

Related U.S. Application Data

(60) Provisional application No. 61/753,156, filed on Jan. 16, 2013.

(51) Int. Cl.
| | |
|---|---|
| H04B 10/00 | (2013.01) |
| H04B 10/08 | (2006.01) |
| H04B 10/25 | (2013.01) |
| H04B 10/2575 | (2013.01) |
| H04B 10/079 | (2013.01) |
| H04L 12/24 | (2006.01) |
| H04J 14/02 | (2006.01) |

(52) U.S. Cl.
CPC ........ *H04B 10/25* (2013.01); *H04B 10/25751* (2013.01); *H04B 10/0793* (2013.01); *H04B 10/0795* (2013.01); *H04J 14/02* (2013.01); *H04L 41/06* (2013.01)

(58) Field of Classification Search
CPC .............. H04B 10/40; H04B 10/271; H04B 10/25751; H04B 10/2575; H04B 10/27; H04B 10/808; H04J 14/0246; H04J 14/025; H04J 3/1694
USPC ........................................................ 398/116
See application file for complete search history.

(56) References Cited

U.S. PATENT DOCUMENTS

| | | | | |
|---|---|---|---|---|
| 5,729,370 A * | 3/1998 | Bernstein | ............ | H04L 25/4921 398/116 |
| 6,852,928 B2* | 2/2005 | Giaretta | ............. | H01S 5/02212 174/547 |
| 6,867,368 B2* | 3/2005 | Kumar | ............... | H01S 5/02212 174/524 |
| 6,895,185 B1* | 5/2005 | Chung | ................ | H04B 10/272 398/115 |
| 7,210,859 B2* | 5/2007 | Kumar | ............... | H01S 5/02212 257/E23.19 |
| 7,228,077 B2* | 6/2007 | Newell | .................. | B82Y 15/00 398/141 |
| 7,623,786 B2* | 11/2009 | Whittlesey | ......... | H04N 7/17309 398/66 |
| 8,090,258 B2* | 1/2012 | DeLew | ................ | H04B 10/073 398/16 |
| 8,249,452 B2* | 8/2012 | Biegert | .............. | H04J 14/0282 398/58 |
| 8,311,412 B2* | 11/2012 | Rakib | ................ | H04N 21/6118 725/111 |
| 8,396,369 B1* | 3/2013 | Farmer | ............. | G02B 6/12007 385/52 |

(Continued)

*Primary Examiner* — Ken N Vanderpuye
*Assistant Examiner* — Abbas H Alagheband
(74) *Attorney, Agent, or Firm* — McAndrews, Held & Malloy

(57) ABSTRACT

Circuitry of a fiber node which is configured to couple to an optical link and an electrical link may comprise an electrical-to-optical conversion circuit for transmitting on the optical link. The circuitry may be operable to receive signals via the optical link. The circuitry may select between or among different configurations of the electrical-to-optical conversion circuit based on the signals received via the optical link. The signals received via the optical link may be intended for one or more gateways served by the fiber node or may be dedicated signals intended for configuration of the circuitry. The circuitry may be operable to generate feedback and insert the feedback into a datastream received from one or more gateways via the electrical link prior to transmitting the datastream onto the optical link.

18 Claims, 8 Drawing Sheets

(56) References Cited

U.S. PATENT DOCUMENTS

| | | | | | |
|---|---|---|---|---|---|
| 8,428,465 B2* | 4/2013 | Biegert | H04B 10/00 398/115 |
| 8,457,086 B2* | 6/2013 | Asati | H04L 12/2801 370/216 |
| 8,467,686 B2* | 6/2013 | Lonn | H04B 10/25751 398/115 |
| 8,554,082 B2* | 10/2013 | Boyd | H04L 12/413 398/116 |
| 8,594,506 B1* | 11/2013 | Farmer | H04B 10/25751 398/115 |
| 8,644,706 B2* | 2/2014 | Rakib | H04B 10/25751 370/229 |
| 8,938,769 B2* | 1/2015 | Rakib | H04N 21/6118 725/119 |
| 2004/0136712 A1* | 7/2004 | Stiscia | H04J 3/1694 398/60 |
| 2007/0223928 A1* | 9/2007 | Farmer | H04Q 11/0067 398/116 |
| 2008/0310849 A1* | 12/2008 | West, Jr. | H04N 7/22 398/116 |
| 2009/0052901 A1* | 2/2009 | Cagle | H04B 10/2504 398/116 |
| 2010/0074614 A1* | 3/2010 | DeLew | H04B 10/272 398/17 |
| 2010/0135265 A1* | 6/2010 | Asati | H04L 12/2801 370/338 |
| 2010/0239251 A1* | 9/2010 | Biegert | H04Q 11/0067 398/58 |
| 2011/0182583 A1* | 7/2011 | Rakib | H04L 12/2801 398/67 |
| 2011/0255862 A1* | 10/2011 | Riggsby | H04B 10/25751 398/25 |
| 2012/0057877 A1* | 3/2012 | Farmer | H04N 7/22 398/116 |
| 2012/0257891 A1* | 10/2012 | Boyd | H04L 47/6215 398/45 |
| 2012/0291084 A1* | 11/2012 | Rakib | H04N 7/10 725/111 |
| 2013/0064507 A1* | 3/2013 | Mahnkopf | G02B 6/26 370/229 |
| 2013/0114955 A1* | 5/2013 | Li | H04B 10/0795 398/16 |
| 2013/0121704 A1* | 5/2013 | Gall | H04B 10/25 398/116 |
| 2014/0101711 A1* | 4/2014 | Rakib | H04N 21/6118 725/129 |
| 2014/0150041 A1* | 5/2014 | Rakib | H04N 21/6118 725/111 |
| 2015/0172072 A1* | 6/2015 | Rakib | H04N 21/6118 725/111 |

* cited by examiner

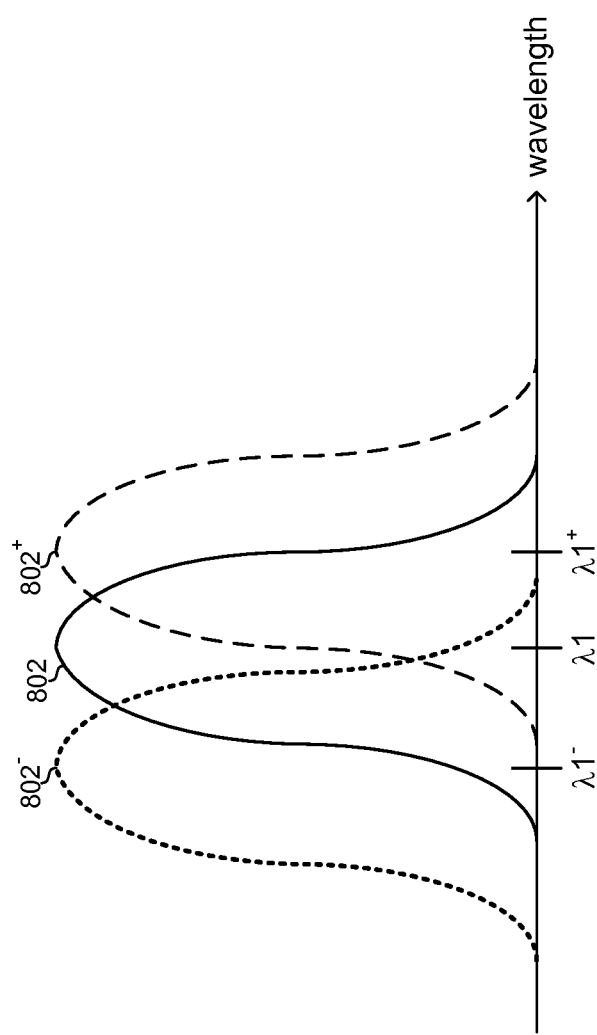

FEEDBACK-BASED CONFIGURATION OF A HYBRID FIBER-COAXIAL NETWORK

CLAIM OF PRIORITY

This patent application makes reference to, claims priority to and claims benefit from U.S. Provisional Patent Application No. 61/753,156, which was filed on Jan. 16, 2013.

The above identified application is hereby incorporated herein by reference in its entirety.

INCORPORATION BY REFERENCE

This patent application makes reference to U.S. patent application Ser. No. 14/147,628 titled "Advanced Fiber Node" and filed on Jan. 6, 2014, which is hereby incorporated herein by reference in its entirety.

TECHNICAL FIELD

Aspects of the present application relate to communication networks. More specifically, aspects of the present application relate to a method and system for a feedback-based configuration of a hybrid fiber-coaxial network.

BACKGROUND OF THE INVENTION

Conventional systems and methods for communications can be overly power hungry, slow, expensive, and inflexible. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method for a feedback-based configuration of a hybrid fiber-coaxial network, substantially as shown in and/or described in connection with at least one of the figures, as set forth more completely in the claims.

Advantages, aspects and novel features of the present disclosure, as well as details of various implementations thereof, will be more fully understood from the following description and drawings.

BRIEF DESCRIPTION OF SEVERAL VIEWS OF THE DRAWINGS

FIG. 8 illustrates characteristics of an example optical component.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
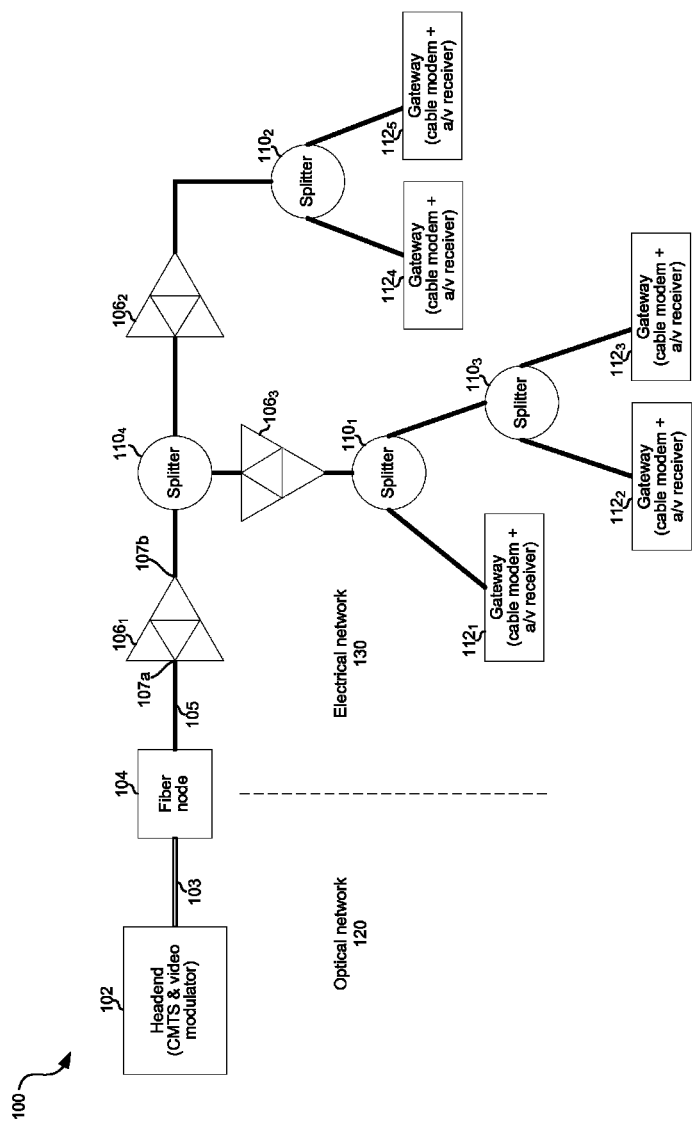
FIG. 1 is a diagram depicting an example hybrid fiber-coaxial (HFC) network.

FIG. 1 is a diagram depicting an example hybrid fiber-coaxial (HFC) network. The example HFC network 100 comprises a headend 102, a fiber node 104, amplifiers $106_1$-$106_3$, splitters $110_1$-$110_4$, and gateways $112_1$-$112_5$.

The headend 102 comprises a cable modem termination system (CMTS) for handling DOCSIS traffic to and from the cable modems of gateways $112_1$-$112_5$ and one or more modulators (e.g., one or more "edge QAMs") for handling downstream multimedia traffic to the audio/video receivers of the gateways $112_1$-$112_5$.

The fiber node (FN) 104 may provide an interface between the optical network 120 and the electrical network 130. The fiber node 104 may, for example, be as described below with reference to FIGS. 2A-6.

Each of the amplifiers $106_1$-$106_3$ comprises a bidirectional amplifier which may amplify downstream signals and upstream signals, where downstream signals are input via upstream interface 107a and output via downstream interface 107b, and upstream signals are input via downstream interface 107b and output via upstream interface 107a. The amplifier $106_1$, which amplifies signals along the main coaxial "trunk," may be referred to as a "trunk amplifier." The amplifiers $106_2$ and $106_3$, which amplify signals along "branches" split off from the trunk, may be referred to as "branch" or "distribution" amplifiers.

Each of the splitters $110_1$-$110_4$ comprises circuitry operable to output signals incident on each of its interfaces onto each of its other interfaces. Each of the splitters $110_1$-$110_4$ may be a passive or active device.

Each of the gateways $112_1$-$112_5$ may comprise cable modem circuitry operable to communicate with, and be managed by, the headend 102 in accordance with one or more standards (e.g., DOCSIS). Each of the gateways $112_1$-$112_5$ may comprise one or more audio/video receivers operable to receive multimedia content (e.g., in the form of one or more MPEG streams) transmitted by the headend 102 in accordance with one or more standards used for cable television. Each of the gateways $112_1$-$112_5$ may reside at the premises of a cable/DOCSIS subscriber.

Figure 2A:
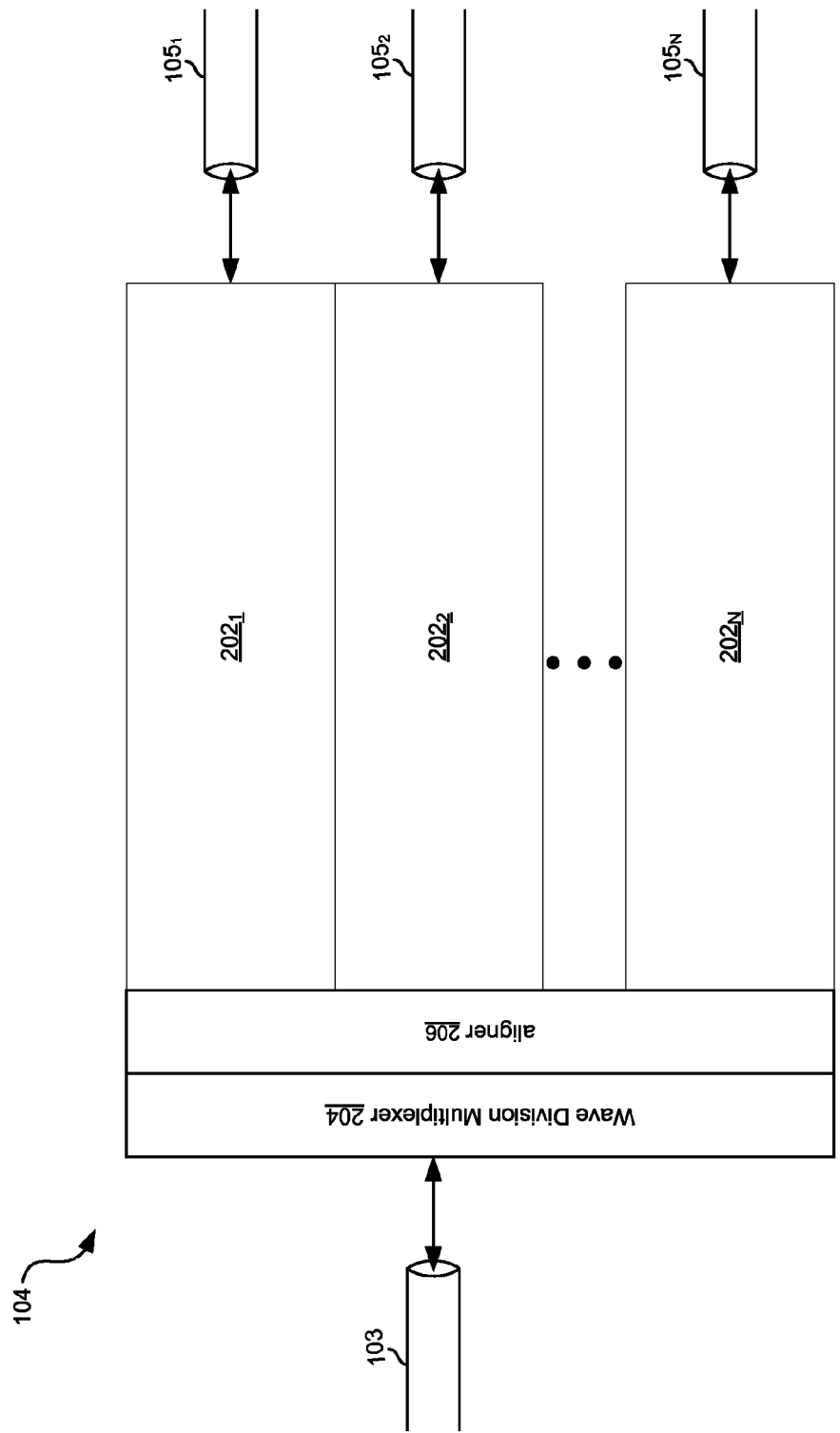
FIG. 2A is a diagram depicting an example implementation of a fiber node.

FIG. 2A is a diagram depicting an example implementation of a fiber node. Referring to FIG. 2A, the depicted example implementation of fiber node 104 comprises a wave division multiplexer (WDM) 204, an electro-mechanical aligner 206, and modules $202_1$-$202_N$ (where N is an integer).

The WDM 204 is operable to multiplex up to N (an integer) upstream signals from up to N modules 202 onto the fiber 103, and demultiplex up to N downstream signals from the fiber 103 to up to N modules 202. For relatively low values of N and/or relatively low amounts of usable bandwidth on fiber 103, the multiplexing may be referred to as "coarse wave division multiplexing." For relatively high values of N and/or relatively high amounts of usable bandwidth on fiber 103, the multiplexing may be referred to as "dense wave division multiplexing."

The aligner 206 may be operable to mechanically adjust the position of the fiber 103, the WDM 204, each of the modules $202_1$-$202_N$, an optical detector of each of the modules $202_1$-$202_N$, and/or a laser diode of each of the modules $202_1$-$202_N$ in response to an electrical control signal from one or more of the modules $202_1$-$202_N$. In this manner, after the fiber node 104 has been deployed in the HFC network, and is in operation serving gateways $112_1$-$112_5$, alignment of the optical components of the fiber node 104 may be adjusted via, for example, dedicated control signals sent from the headend 102, and/or autonomously based on monitoring in the fiber node 104.

Each module $202_n$ (1≤n≤N) is operable to receive an optical signal via fiber 103 and output a corresponding electrical signal on coaxial cable $105_n$, and receive an electrical signal on coaxial cable $105_n$ and output a corresponding optical signal on fiber 103. Each module $202_n$ may, for example, be as described below with reference to FIGS. 2B-6.

Figure 2B:
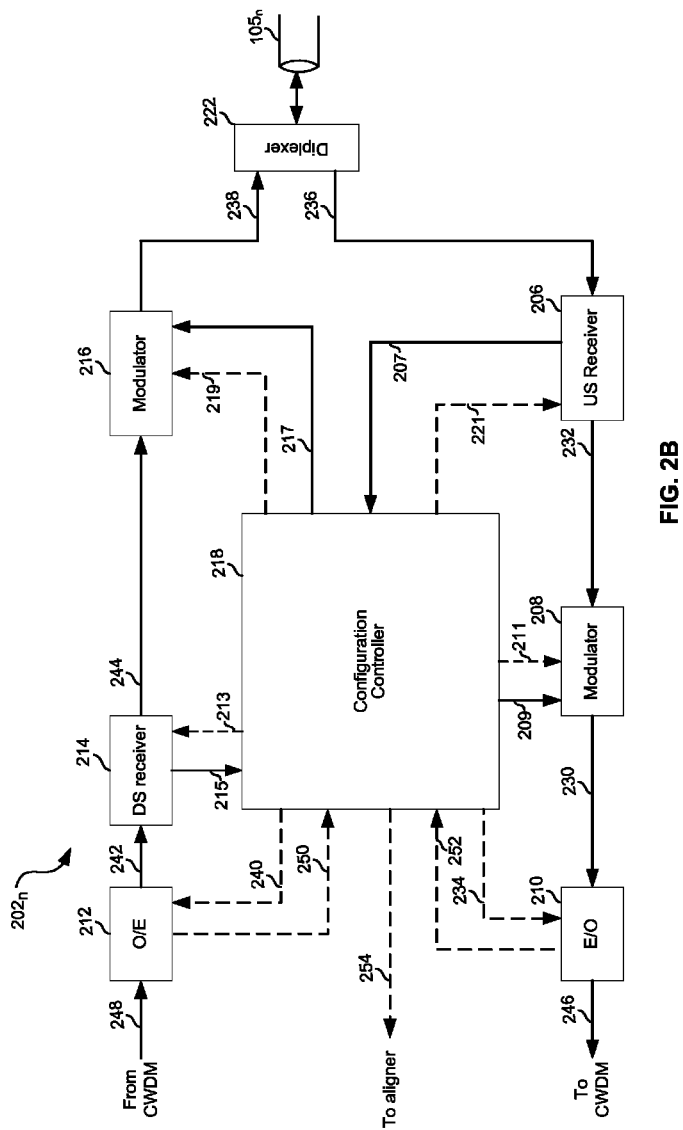
FIG. 2B depicts an example implementation of a reconfigurable fiber node.

FIG. 2B depicts an example implementation of a reconfigurable fiber node. Referring to FIG. 2B, there is shown a module $202_n$ (1≤n≤N) of the fiber node (FN) 104. The example module $202_n$ comprises a downstream optical-to-electrical (O/E) conversion circuit 212, an upstream electrical-to-optical (E/O) conversion circuit 210, a downstream receiver 214, a downstream modulator 216, an upstream burst receiver 206, an upstream encoder 208, a diplexer 222 and a configuration controller 218.

The O/E conversion circuit 212 is operable to convert the optical signal 248 to an electrical signal (voltage and/or current on a conductor) 242.

Figure 3:
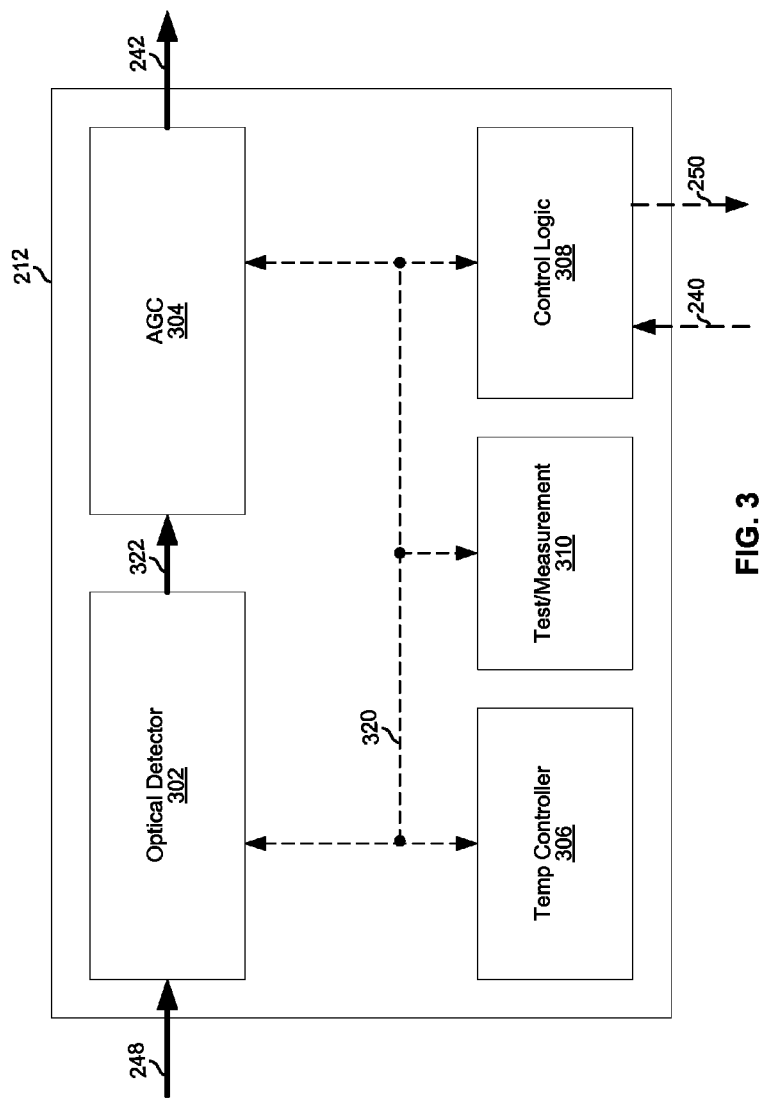
FIG. 3 is a diagram depicting an example implementation of an optical-to-electrical (O/E) conversion circuit in a fiber node.

Referring briefly to FIG. 3, an example implementation of the O/E conversion circuit 212 comprises an optical detector 302, an automatic gain control (AGC) circuit 304, a temperature controller 306, test and measurement circuitry 310, and control logic 308. The optical detector 302 is operable to output an electrical signal 322 having a current and/or voltage that corresponds to the intensity of the optical signal 248. The automatic gain control (AGC) circuit 304 operates to control the current and/or voltage levels of signal 322 to output a signal 242 that remains between desired levels. The control logic 308 is operable to control the various components of the O/E conversion circuit 212 and to interface the O/E conversion circuit 212 to the configuration controller 218. The temperature controller 306 is operable to heat and/or cool the optical detector 302 to maintain the optical detector 302 within a desired range of temperatures. The temperature controller 306 may perform heating, passive cooling (i.e., heatsinking that does not require input power), and/or active cooling (e.g., MEMS heatsinks fans, heat exchangers, or refrigerators that require input power). The center wavelength of the detector 302 (the wavelength for which power coupling between the optical signal and the electrical signal is best) may depend on the temperature of the detector 302. Accordingly, the temperature controller 306 may control the temperature of the detector 302 to maintain a particular center wavelength and/or to switch between different center wavelengths. For example, the temperature may be controlled to track λ1 and/or may be controlled to switch from λ1 to λ2.

Returning to FIG. 2A, the O/E conversion circuit 212 may output a monitor signal 250 which may provide information about operation and/or configuration of the O/E conversion circuit 212. The signal 250 may comprise measurement/calibration data and/or configuration settings for the O/E conversion circuit 212. The signal 250 may convey, for example, measured wavelength of a received optical signal, measured intensity of the received optical signal, measured temperature of the detector 302, and/or any other characteristics of the O/E conversion circuit 212 which may be useful for configuring the module $202_n$ and/or for providing feedback to the headend 102. The O/E conversion circuit 212 may be configured via control signal 240 from configuration controller 218.

The receiver 214 may is operable to process the electrical signal 242 to recover data which is then output as signal 244. Such processing may include, for example, equalization, filtering, demapping, decoding, deinterleaving, and/or the like. Any of the functions of the receiver 214 may be configured via control signal 213. The receiver 214 may output a monitor signal 215.

The signal 215 may comprise downstream data from the headend 102 intended for one or more gateways 112 and "sniffed" by the module $202_n$, and/or may comprise performance metrics (symbol error rate, a bit error rate, amount of multimode dispersion, signal-to-noise ratio, and/or the like) of signal(s) 242 and/or 244 measured by the receiver 214. In this manner, after the module $202_n$ has been deployed in the HFC network and is in operation serving gateways 112, the module $202_n$ may autonomously configure itself without requiring intervention from the service provider. Additionally or alternatively, the signal 215 may comprise dedicated control data from the headend 102 intended for the module $202_n$. In this manner, after the module $202_n$ has been deployed in the HFC network and is in operation serving gateways 112, a service provider may intervene to reconfigure the module $202_n$ but can do so from a remote location without having to physically send a technician to the FN 104.

Figure 4:
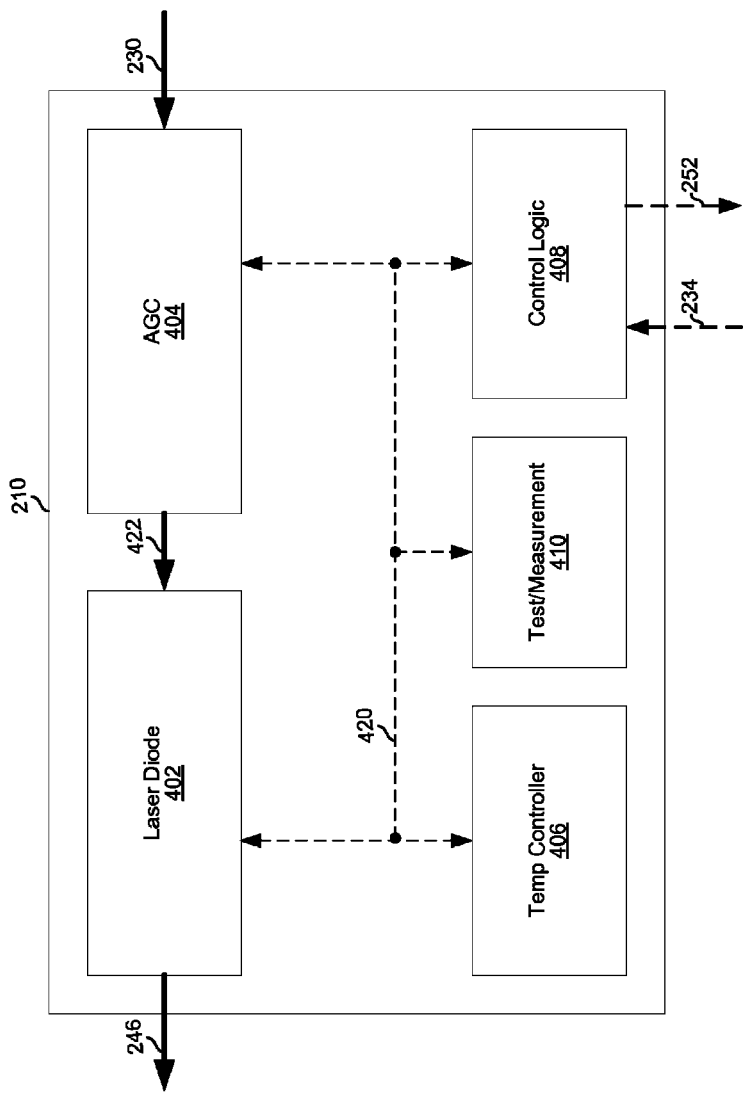
FIG. 4 is a diagram depicting an example implementation of an electrical-to-optical (E/O) conversion circuit in a fiber node.

Referring briefly to FIG. 4, an example implementation of the E/O conversion circuit 210 comprises a laser diode 402, a driver/AGC circuit 404, a temperature controller 406, test and measurement circuitry 410, and control logic 408. The laser diode 402 is operable to output an optical signal 246 whose intensity corresponds to the voltage and/or current of the electrical signal 422. The driver/AGC circuit 404 operates to control the current and/or voltage levels of signal 230 to output a signal 422 that remains between desired levels. The control logic 408 is operable to control the various components of the E/O conversion circuit 210 and to interface the E/O conversion circuit 210 to the configuration controller 218. The temperature controller 406 is operable to heat and/or cool the laser diode 402 to maintain the laser diode 402 within a desired range of temperatures. The temperature controller 406 may perform heating, passive cooling (i.e., heatsinking that does not require input power), and/or active cooling (e.g., MEMS heatsinks fans, heat exchangers, or refrigerators that require input power). The center wavelength of optical signal transmitted by the laser diode 402 may depend on the temperature of the laser diode 402. Accordingly, the temperature controller 406 may control the temperature of the laser diode 402 to maintain a particular center wavelength and/or to switch between different center wavelengths. For example, the temperature may be controlled to track $\lambda 1$ and/or may be controlled to switch from $\lambda 1$ to $\lambda 2$.

The modulator 216 may be operable to modulate the signal 244 and/or 217 onto one or more RF carriers to generate the signal 238 which is transmitted onto the coax $105_n$ via the diplexer 222. The signal 217 may comprise feedback and/or other control information that is inserted into/merged with the data 244 for communication to the gateways 112 served via coax $105_n$. The modulation may include, for example, interleaving, filtering, bit-to-symbol mapping, encoding, upconverting, and/or other functions. Any of the functions of the modulator 216 may be configured via control signal 219. The modulation performed by modulator 216 may be in accordance with one or more DOCSIS standard (e.g., DOCSIS 1.0, 2.0, 3.0, etc.) cable television standard, and/or other standard supported by the gateways 112 served via coax $105_n$.

The diplexer 222 may be operable to couple downstream signal 238 onto the coaxial cable $105_n$ while concurrently passing upstream signals (originating from gateways 112 served via coax $105_n$) from coax $105_n$ into the FN as signal 236.

The receiver 206 is operable to process the electrical signal 236 to recover data which is then output as signal 232. Such processing may include, for example, equalization, filtering, demapping, decoding, deinterleaving, and/or the like. Any of the functions of the receiver 206 may be configured via control signal 221. The receiver 206 may output a monitor signal 207.

The signal 207 may comprise upstream data from the gateway(s) 112 intended for the headend 102 and "sniffed" by the module $202_n$ and/or the signal 207 may comprise performance metrics (SER, BER, SNR, and/or the like) measured by the receiver 206. In this manner, after the module $202_n$ has been deployed in the HFC network and is in operation serving gateways 112, the module $202_n$ may autonomously configure itself without requiring intervention from the service provider. Additionally or alternatively, the signal 207 may comprise dedicated control data from the gateway(s) 112 intended for the module $202_n$. In this manner, after the module $202_n$ has been deployed in the HFC network and is in operation serving gateways 112, a service provider may intervene to reconfigure the module $202n$ but can do so from a remote location without having to physically send a technician to the FN 104.

The modulator 208 is operable to modulate the signal 232 and/or 209 onto one or more RF carriers to generate the signal 230. The signal 209 may comprise feedback and/or other control information that is inserted into/merged with the data 232 for communication to the headend 102 that serves the module $202_n$. The modulation may include, for example, interleaving, filtering, bit-to-symbol mapping, encoding, upconverting, and/or other functions. Any of the functions of the modulator 208 may be configured via control signal 211. The modulation performed by modulator 208 may be in accordance with one or more DOCSIS standards (e.g., DOCSIS 1.0, 2.0, 3.0, etc.), Ethernet over Passive Optical Network (EPON), and/or other standard supported by the headend 102.

The E/O conversion circuit 210 may comprise, for example, a laser diode and a gain control circuit for converting an electrical signal to an optical signal.

Returning to FIG. 2A, the E/O conversion circuit 210 may output a monitor signal 252 which may provide information about operation and/or configuration of the O/E conversion circuit 210. The signal 252 may comprise measurement/calibration data and/or configuration settings for the E/O conversion circuit 210. The signal 252 may convey, for example, measured wavelength of a transmitted optical signal, measured intensity of the transmitted optical signal, measured temperature of the laser diode 402, and/or any other characteristics of the E/O conversion circuit 210 which may be useful for configuring the module $202_n$ and/or for providing feedback to the headend 102. The O/E conversion circuit 212 may be configured via control signal 234 from configuration controller 218.

The configuration controller 218 may be operable to control configuration of the module $202_n$, send feedback and/or other controls signals to the headend 102, and/or send feedback and/or other control signals to the gateways 112 served via coax $105_n$. The configuration of the various components of module $202_n$ may be achieved via signals 240, 213, 219, 221, 211, and 234. The configuration and/or control signals generated by controller 218 may be based on any one or more of signals 215, 207, 250, and 252 described above.

Figure 5:
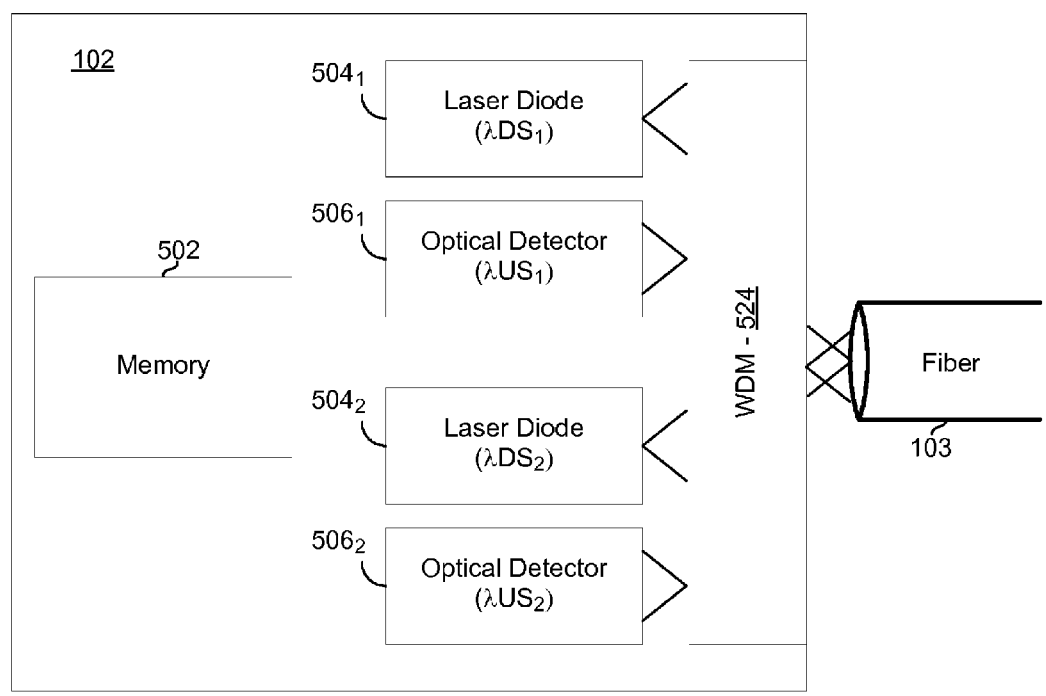
FIG. 5 is a diagram depicting example components of a headend.

FIG. 5 is a diagram depicting example components of a headend. Shown are a WDM 524, optical detectors $504_1$ and $504_2$, laser diodes $506_1$ and $506_2$, and a memory 502.

Each of the optical detectors $504_1$ and $504_2$ may be similar to the detector 302 described above. Each of the laser diodes $506_1$ and $506_2$ may be similar to the laser diode 402 described above.

Each of the detectors in the headend 102 and the fiber node 104 may have a nominal center wavelength (the wavelength that the detector detects best at a particular temperature) which, due to non-idealities, may be different than the nominal center wavelength of any one or more others of the detectors. Similarly, each of the laser diodes in the headend 102 and the fiber node 104 may have a nominal center wavelength (the wavelength of peak intensity) which, (due to non-idealities, may be different than the nominal center wavelength of any one or more others of the laser diodes.

The nominal center frequency of various detectors and diodes may be taken into account when building the headend 102 and when building the fiber node 104. For example, when a diode 402 and detector 302 for a particular module $202_n$ are selected, a diode and detector having sufficiently different nominal center wavelengths may be chosen. Similarly, when N diodes 504 [or detectors 506] to be placed in the headend 102 or in N modules 202 intended for FN 104 are selected, N laser diodes [or detectors] with particular and/or sufficiently different nominal center wavelengths may be chosen. In this regard, during manufacturing, laser diodes and detectors may be categorized or "binned" based on their nominal center wavelengths. A plurality of laser diodes and detectors having nominal center wavelengths that span the range of wavelengths supported by the WDMs 204 and 524 may then be installed into each headend 102 and/or fiber node 104.

The nominal center frequency of various detectors and diodes may be taken into account when which modules $202_1$-$202_n$ to be installed in the fiber node 104 is determined. For example, given the nominal center wavelengths of the laser diode $504_1$ and detector $506_1$ of the headend, it may be desirable to select as module $202_1$ a module 202 whose detector 302 has a nominal center frequency very close to the nominal center frequency of laser diode $504_1$ and whose laser diode 402 has a nominal center frequency very close to the nominal center frequency of laser diode $506_1$.

The nominal center frequency of various detectors and diodes may be taken into account when the headend 102 and/or the installed modules $202_1$-$202_N$ are configured. For example, assuming two modules $202_1$ and $202_2$ are installed in the fiber node 104, the modules $202_1$ and $202_2$ may measure and transmit their respective diode and detector nominal center wavelengths as feedback/control information, which the headend 102 may then store in memory 502. For example, the nominal center wavelength of the laser diode 402 in module $202_1$ may be longer than the nominal center wavelength of the laser diode 402 in module $202_2$. The headend 102 may then assign the module $202_1$ to a longer upstream wavelength, pair module $202_1$ with the one of detectors $506_1$ and $506_2$ having a nominal center frequency closer to that longer wavelength, assign the module $202_2$ to a shorter upstream wavelength, and pair module $202_1$ with the one of detectors $506_1$ and $506_2$ having a nominal center frequency closer to that longer wavelength. The result may be that less power is consumed in trying to stabilize the wavelength of the diodes, since they are allowed to operate close to their nominal center wavelength.

As a result, characterizing nominal center wavelengths and using such information in building, installing, and configuring the headend 102 and fiber node 104, less margin may be needed to allow for drift or mismatch. This may enable transmitting more bits per wavelength and/or more wavelengths per fiber $103_n$.

Figure 6:
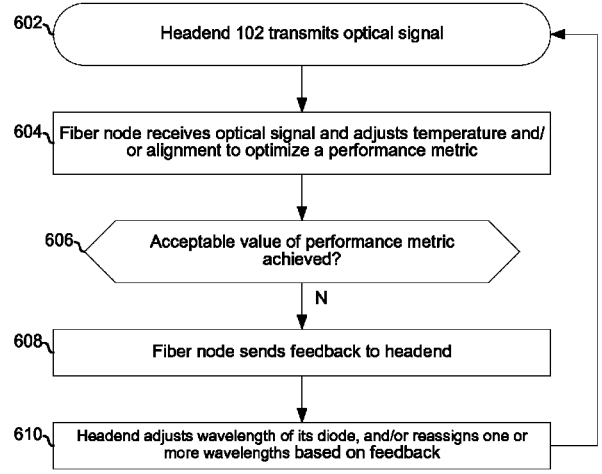
FIG. 6 is a flow chart illustrating example steps for a configuration of a fiber node and headend.

FIG. 6 is a flow chart illustrating example steps for a configuration of a fiber node and headend. The process begins in block 602 with the headend 102 transmitting a downstream optical signal onto fiber 103. In block 604, the fiber node 104 receives the downstream optical signal and attempts to optimize one or more performance metrics by adjusting alignment via the aligner 206 and/or adjusting temperature via temperature controller 406 in a closed-loop fashion. This may be done for each module 202 of the fiber node 104 and for each center wavelength of the downstream optical signal to find the best configuration of the fiber node 104. Adjustment of the optical components may be instead of, or in addition to, adjustment of the electrical components such as AGC 304 and receiver 214. In block 606, if an acceptable level of the performance metric cannot be achieved for each module 202 of the fiber node 104, feedback (e.g., measured characteristics of the optical signal and/or the measured values of the performance metric for one or more of the modules $202_1$-$202_N$) is sent to the headend 102. In block 610, the headend 102 uses the feedback to adjust its laser diode(s) to fine tune the center wavelengths being sent on fiber 103, to coarsely select one or more different center wavelengths to send on the fiber 103, and/or to adjust an output power of its laser diode(s).

Figure 7:
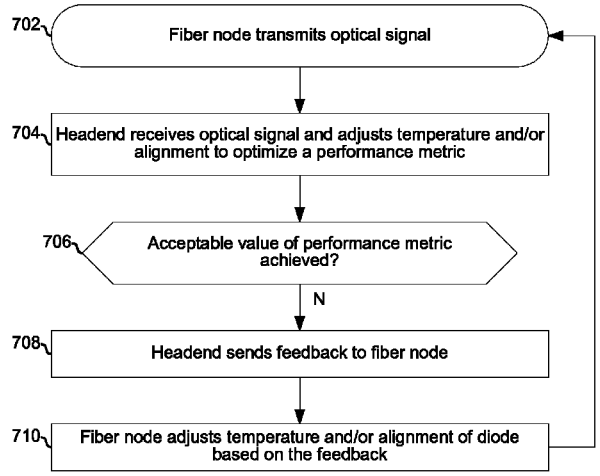
FIG. 7 is a flow chart illustrating example steps for a configuration of a fiber node and headend.

FIG. 7 is a flow chart illustrating example steps for a configuration of a fiber node and headend. The process begins in block 702 with the fiber node 104 transmitting an optical signal onto fiber 103. In block 704, the headend 102 receives the optical signal and attempts to optimize one or more performance metrics by adjusting alignment (e.g., via an aligner such as aligner 206 implemented in the headend 102) and/or adjusting wavelength (e.g., via a temperature controller such as temperature controller 406 implemented in the headend 102) in a closed-loop fashion. This may be done for each center wavelength of the upstream optical signal to find the best configuration of the fiber node 104. Adjustment of the optical components may be instead of, or in addition to, adjustment of the electrical components in the headend 102. In block 706, if an acceptable level of the performance metric cannot be achieved for each module 202 of the fiber node 104, feedback (e.g., measured characteristics of the optical signal and/or the measured values of the performance metric for one or more of the center wavelengths) is sent to the fiber node 104. In block 710, the fiber node 104 uses the feedback to finely tune one or more center wavelengths (e.g., via temperature controller(s) 406), to adjust alignment of the optical components (e.g., via the aligner 206), and/or adjust output power of one or more of its laser diodes 402 (e.g., via AGC 404).

FIG. 8 illustrates characteristics of an example optical component. Shown is the bandwidth of an example optical component such as detector 302 or laser 402. The component has a nominal center wavelength $\lambda 1$ as indicated by the solid line. When the component heats up (relative the temperature at which its nominal center wavelength was measured) its center wavelength moves to $\lambda 1^+$ and when it cools down (relative the temperature at which its nominal center wavelength was measured) its center wavelength moves to $\lambda 1$.

In an example implementation of this disclosure, circuitry (e.g., circuitry of module $202_n$) for use in a fiber node (e.g., 104) may be configured to couple to an optical link (e.g. 103) and to an electrical link (e.g., $105_n$). The circuitry may comprise an electrical-to-optical conversion circuit (210) for transmitting on the optical link. The circuitry may be operable to select among different configurations of the electrical-to-optical conversion circuit based on signals (e.g., 248) received via the optical link. The signals received via the optical link may be intended for one or more gateways served by the fiber node (i.e., the circuitry may "sniff" them) and/or may be intended for the fiber node and dedicated for configuration of the circuitry. In one configuration, the electrical-to-optical conversion circuit may transmit at a first power onto the optical link, and in another configuration may transmit at a second power, higher than the first power, onto the optical link. In one configuration, the electrical-to-optical conversion circuit may transmit at a first wavelength onto the optical link, and in another configuration it may transmit at a second wavelength, shorter than the first wavelength, onto the optical link. The circuitry may be operable to generate feedback data and insert the feedback data into a datastream received from one or more gateways via the electrical link prior to transmitting the datastream onto the optical link.

The electrical-to-optical conversion circuit may comprise a laser diode (e.g., 402) and a temperature controller (e.g., 406) operable to perform active cooling. In one configuration, the temperature controller may be configured to hold the laser diode at a first temperature (which may correspond to the diode having a first center wavelength), and in another configuration, the temperature controller may be configured to hold the laser diode at a second temperature, lower than the first temperature (which may correspond to the diode having a second center wavelength). The fiber node may comprise a wave division multiplexer (e.g., 204) and an electro-mechanical aligner (e.g., 206) operable to adjust alignment of the laser diode and the wave division multiplexer. In one configuration, the electro-mechanical aligner may be configured such that the laser diode and the wave division multiplexer are in a first spatial arrangement (e.g., one is too far up, down, left, or right high relative to the other such that the optical path is misaligned), and in another configuration, the electro-mechanical aligner is configured such that the laser diode and the wave division multiplexer are in a second spatial arrangement (e.g., the misalignment of the optical path is corrected).

The circuitry may comprise a first laser diode having a first nominal center wavelength and a second laser diode having a second nominal center wavelength, shorter than the first nominal center wavelength. The circuitry may be operable to transmit a value (e.g., a binary number) representing the first nominal center wavelength and the second nominal center wavelength onto the optical link for use by the headend. The circuitry may be configured to perform the selection among different configurations of the electrical-to-optical conversion circuit autonomously based on a measured performance metric of the signals received via the optical link.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the methods described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
   circuitry for use in a fiber node configured to couple to an optical link and to an electrical link, wherein:
   said circuitry comprises an electrical-to-optical conversion circuit for transmission on said optical link;
   said circuitry is operable to select between or among different configurations of said electrical-to-optical conversion circuit based on signals received via said optical link;
   said circuitry comprises a first laser diode having a first nominal center wavelength and a second laser diode having a second nominal center wavelength, shorter than said first nominal center wavelength; and
   said circuitry is operable to transmit a value representing said first nominal center wavelength and said second nominal center wavelength onto said optical link for use by a headend that serves said fiber node.

2. The system of claim 1, wherein said signals received via said optical link are intended for one or more gateways served by said fiber node.

3. The system of claim 1, wherein said signals received via said optical link are intended for said fiber node and dedicated for configuration of said circuitry.

4. The system of claim 1, wherein:
   in a first of said different configurations, said electrical-to-optical conversion circuit transmits at a first power onto said optical link; and
   in a second of said different configurations, said electrical-to-optical conversion circuit transmits at a second power, higher than said first power, onto said optical link.

5. The system of claim 1, wherein:
   in a first of said different configurations, said electrical-to-optical conversion circuit transmits at a first wavelength onto said optical link; and
   in a second of said different configurations, said electrical-to-optical conversion circuit transmits at a second wavelength, shorter than said first wavelength, onto said optical link.

6. The system of claim 1, wherein:
   said electrical-to-optical conversion circuit comprises a laser diode and a temperature controller operable to perform active cooling;
   in a first of said different configurations, said temperature controller is configured to hold said laser diode at a first temperature; and
   in a second of said different configurations, said temperature controller is configured to hold said laser diode at a second temperature, lower than said first temperature.

7. The system of claim 1, wherein:
   said fiber node comprises:
   a wave division multiplexer; and
   an electro-mechanical aligner operable to receive an electrical control signal and mechanically adjust alignment of said first laser diode and said wave division multiplexer based on said electrical control signal;
   in a first configuration of said electro-mechanical aligner, said electro-mechanical aligner is configured such that said first laser diode and said wave division multiplexer are in a first spatial arrangement; and
   in a second configuration of said electro-mechanical aligner, said electro-mechanical aligner is configured such that said first laser diode and said wave division multiplexer are in a second spatial arrangement different than said spatial arrangement.

8. The system of claim 1, wherein said circuitry is operable to generate feedback data and insert said feedback data into a datastream received from one or more gateways via said electrical link prior to transmission of the datastream onto said optical link.

9. The system of claim 1, wherein said circuitry is configured to perform said selection between or among different configurations of said electrical to optical conversion circuit autonomously based on a measured performance metric of said signals received via said optical link.

10. A method comprising:
performing by circuitry in a fiber node configured to couple to an optical link and to an electrical link, wherein:
said circuitry comprises:
an electrical-to-optical conversion circuit for transmitting on said optical link;
a first laser diode having a first nominal center wavelength; and
a second laser diode having a second nominal center wavelength, shorter than said first nominal center wavelength; and
said method comprises:
selecting between or among different configurations of said electrical-to-optical conversion circuit based on signals received via said optical link; and
transmitting a value representing said first nominal center wavelength and said second nominal center wavelength onto said optical link for use by a headend that serves said fiber node.

11. The method of claim 10, wherein said signals received via said optical link are intended for one or more gateways served by said fiber node.

12. The method of claim 10, wherein said signals received via said optical link are intended for said fiber node and dedicated for configuration of said circuitry.

13. The method of claim 10, comprising:
while said circuitry is in a first of said different configurations, transmitting, via said electrical-to-optical conversion circuit, onto said optical link at a first power; and
while said circuitry is in a second of said different configurations, transmitting, by said electrical-to-optical conversion circuit, onto said optical link at a second power, higher than said first power.

14. The method of claim 10, comprising:
while said circuitry is in a first of said different configurations, transmitting, via said electrical-to-optical conversion circuit, onto said optical link at a first wavelength; and
while said circuitry is in a second of said different configurations, transmitting, via said electrical-to-optical conversion circuit, onto said optical link at a second wavelength, shorter than said first wavelength.

15. The method of claim 10, wherein said electrical-to-optical conversion circuit comprises a laser diode and a temperature controller operable to perform active cooling, and said method comprises:
while said circuitry is in a first of said different configurations, configuring said temperature controller to hold said laser diode at a first temperature; and
while said circuitry is in a second of said different configurations, configuring said temperature controller to hold said laser diode at a second temperature, lower than said first temperature.

16. The system of claim 10, wherein said fiber node comprises a wave division multiplexer, a configuration controller, and an electro-mechanical aligner operable to adjust alignment of said first laser diode and said wave division multiplexer, and said method comprises:
detecting misalignment of an optical path in said fiber node; and
controlling, via a control signal generated by said configuration controller, said electro-mechanical aligner to mechanically adjust said electro-mechanical aligner to correct said misalignment.

17. The method of claim 10, comprising:
generating, by said circuitry, feedback data; and
inserting, by said circuitry, said feedback data into a datastream received from one or more gateways via said electrical link prior to transmitting the datastream onto said optical link.

18. The method of claim 10, comprising selecting between or among different configurations of said electrical to optical conversion circuit autonomously based on a measured performance metric of said signals received via said optical link.

* * * * *